W. H. MILLER.
MEANS FOR FASTENING SPRINGS TO VEHICLES.
APPLICATION FILED MAY 11, 1916.
1,219,981. Patented Mar. 20, 1917.
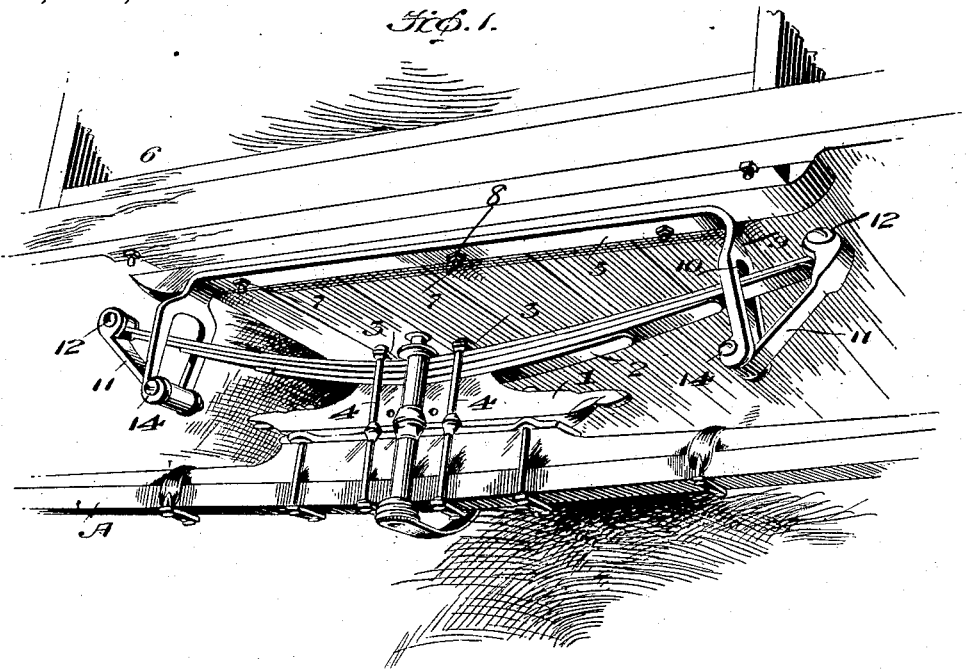
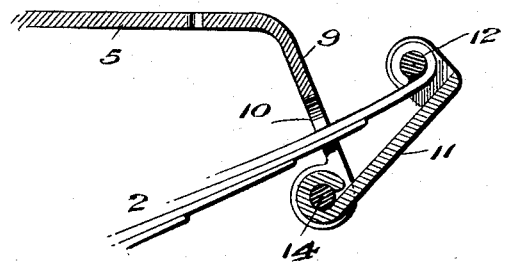
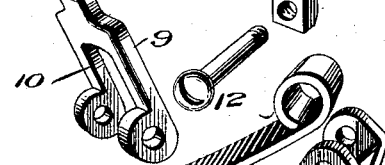
Inventor
William H. Miller
Witness
By Walter T. Estabrook
his Attorney

UNITED STATES PATENT OFFICE.

WILLIAM H. MILLER, OF FAIRBANK, IOWA.

MEANS FOR FASTENING SPRINGS TO VEHICLES.

1,219,981.  Specification of Letters Patent.  Patented Mar. 20, 1917.

Application filed May 11, 1916.  Serial No. 96,834.

*To all whom it may concern:*

Be it known that I, WILLIAM H. MILLER, a citizen of the United States, residing at Fairbank, in the county of Buchanan and State of Iowa, have invented new and useful Improvements in Means for Fastening Springs to Vehicles, of which the following is a specification.

This invention relates to an improvement in means for fastening springs to vehicles.

The object of the invention is to provide a device for fastening springs to a vehicle body, and particularly to light delivery or spring wagons, so that the body may be lowered for convenience of user, and at the same time eliminate the strain on the bolts and clips which fasten the springs to the axles in carrying loads over rough roads. Furthermore, by this fastening device the body may be mounted so as to project over the springs and thereby equalize the load and strain over both axles.

With the present construction now in general use to accomplish this purpose, low wheels are provided, making a hard running vehicle; or by employing a drop axle, which necessitates the procuring of a new axle whenever the stubs become worn, as new stubs cannot be welded on; and again by setting the body back of the front spring by employing a spring bar with drop hangers over the spring, thereby setting the body too far back from the spring, and making too great a distance between the draft animal and load, which causes the load to be placed practically and entirely over the rear axle.

With the present invention, these objections are overcome, as cross bars are provided which are connected to the underside of the vehicle body, as far back from the ends as desirable, and the ends of the cross bars are connected preferably, to the ends of semi-elliptic springs, one of the springs being connected at its central portion to the fifth wheel of the front axle, and the other spring directly to the rear axle. In this way the body is lowered to a position convenient for delivery and other purposes, as well as relieving the strain on the clips and bolts which connect the springs to the axles, and equalizes the load between the two axles.

The invention consists of certain novel features of construction and combinations of parts, which will be hereinafter described and pointed out in the appended claims.

In the accompanying drawings:

Figure 1 is a perspective view showing the invention applied to the front axle and body of a vehicle;

Fig. 2 is a detail longitudinal sectional view through the spring and cross bar; and Fig. 3 is a perspective view in detail, showing the construction of the ends of the cross bar and spring and means for connecting them together.

A represents the front axle of a vehicle, and 1 is the fifth wheel. A semi-elliptic spring 2 is connected at its central portion to the fifth wheel 1. by clips 3 and bolts 4.

A cross bar 5 is connected to the underside of a vehicle body 6 by bolts 7 and nuts 8. The ends 9 of the cross bar 5 project downwardly at a slight angle or incline, and are provided with bifurcations or slots 10. The ends of the spring 2 extend through the bifurcations or slots 10, and have links 11 connected thereto by bolts 12 and nuts 13, forming a pivotal connection between the links and spring. The links 11 extend downwardly from the spring 2, and inwardly and are connected to the terminals of the ends 9 by bolts 14.

The ends of the spring 2 will when stress is applied to the spring by the weight of the load, or as the vehicle comes in contact with an obstruction, such as traveling over rough roads, be caused to move outwardly and downwardly carrying the upper ends of the links 11 with them, for sustaining the load and overcoming the shock transmitted to the vehicle body. The ends 9 of the cross bar 5 will permit of a slight flexing and thereby eliminate to a great degree the rebound of the spring as the vehicle passes over ruts and obstructions.

From the foregoing it will be seen that I have provided a connection between the body and axle for affording a spring support for the body which allows the body to be lowered from six to seven inches more than is possible when an elliptic spring is employed, and at the same time acquire all of the benefits of a full elliptic spring. The cross bar 5 prevents any possibility of lateral or sidewise movement of the body and insures the maintenance of the body in an upright position.

The cross bar can be manufactured at a small cost and readily applied to a vehicle body in connection with a semi-elliptic spring, and a low vehicle body obtained, with the body positioned with respect to the axles that the load may be carried by both axles.

The spring 2 is connected directly to the rear axle of the vehicle, but it has not been deemed necessary to show more than one application of the device.

What I claim is:—

1. The combination of a spring and a rigid cross-bar, said cross bar having outwardly extending ends projecting beyond the terminals of the spring, the terminals of the spring extending beyond the outwardly extending ends of the cross-bar, and means pivotally connecting the terminals of the spring to the ends of the cross-bar for maintaining them in their proper relation to each other.

2. Means for fastening springs to vehicles, comprising a semi-elliptic spring and a rigid cross bar, said cross bar having outwardly extending ends projecting below the terminals of the spring, and means pivotally connecting the terminals of the spring to the ends of the cross bar and maintaining them in their proper relation to each other.

3. Means for fastening springs to vehicles, comprising a semi-elliptic spring and a rigid cross bar, said cross bar having outwardly extending bifurcated ends through which bifurcations the ends of the spring extend, and links pivotally connecting the ends of the springs to the ends of the cross bar.

WILLIAM H. MILLER.

Copies of this patent may be obtained for five cents each, by addressing the "Commissioner of Patents, Washington, D. C."